United States Patent
Savard et al.

(10) Patent No.: US 12,442,311 B1
(45) Date of Patent: Oct. 14, 2025

(54) TURBINE CASE STRUCTURE FOR AN AIRCRAFT PROPULSION SYSTEM ENGINE

(71) Applicant: Pratt & Whitney Canada Corp., Longueuil (CA)

(72) Inventors: Philippe Savard, Terrebonne (CA); Guy Lefebvre, St-Bruno (CA); Remy Synnott, St-Jean-sur-Richelieu (CA); Ruoxin Huang, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/990,597

(22) Filed: Dec. 20, 2024

(51) Int. Cl.
  F01D 11/00 (2006.01)
  F01D 25/24 (2006.01)

(52) U.S. Cl.
  CPC ............ F01D 11/003 (2013.01); F01D 25/24 (2013.01); *F05D 2220/323* (2013.01); *F05D 2240/57* (2013.01); *F05D 2250/711* (2013.01); *F05D 2250/712* (2013.01); *F05D 2260/96* (2013.01)

(58) Field of Classification Search
  None
  See application file for complete search history.

(56) References Cited

U.S. PATENT DOCUMENTS

| | | | |
|---|---|---|---|
| 6,854,738 B2 | 2/2005 | Matsuda | |
| 7,229,249 B2 * | 6/2007 | Durocher | F01D 9/02 |
| | | | 415/213.1 |
| 9,388,741 B2 * | 7/2016 | Gekht | F02C 7/10 |
| 10,036,277 B2 | 7/2018 | Beaujard | |
| 10,830,103 B2 | 11/2020 | Mohammed | |
| 11,168,828 B2 * | 11/2021 | Macfarlane | F01D 25/243 |
| 11,536,162 B2 * | 12/2022 | Yamashita | F01D 25/24 |
| 2010/0242494 A1 | 9/2010 | Mulcaire | |

* cited by examiner

*Primary Examiner* — Danielle M. Christensen
(74) *Attorney, Agent, or Firm* — Getz Balich LLC (57) ABSTRACT

A gas turbine engine includes a turbine section, a turbine case, an inner case, and a damping seal baffle. The turbine section extends along a rotational axis of the gas turbine engine. The turbine case includes a cantilevered inner wall. The cantilevered inner wall extends circumferentially about the rotational axis. The cantilevered inner wall extends between and to an upstream axial end and a downstream axial end. The upstream axial end is disposed at and downstream of the turbine section. The cantilevered inner wall forms a first sealing surface and a second sealing surface. The inner case extends and the damping seal baffle extend circumferentially about the rotational axis. The damping seal baffle is mounted to the inner case. The damping seal baffle is disposed in contact with one or both of the first sealing surface or the second sealing surface.

20 Claims, 6 Drawing Sheets

TURBINE CASE STRUCTURE FOR AN AIRCRAFT PROPULSION SYSTEM ENGINE

TECHNICAL FIELD

This disclosure relates generally to turbine case structures for aircraft propulsion system engines and, more particularly, to turbine case structures including a complaint damper seal baffle.

BACKGROUND OF THE ART

Aircraft engines, such as those found in aircraft propulsion systems, typically include one or more static structure cases configured to house and support engine components. These cases may additionally direct gas flow through the engine. Various engine cases and case structures for aircraft engines are known. While these known engine cases and case structures may be suitable for their intended purposes, there is always room in the art for improvement.

SUMMARY

According to an aspect of the present disclosure, a gas turbine engine for an aircraft includes a turbine section, a turbine case, an inner case, and a damping seal baffle. The turbine section extends along a rotational axis of the gas turbine engine. The turbine case includes a cantilevered inner wall disposed downstream of the turbine section. The cantilevered inner wall extends circumferentially about the rotational axis. The cantilevered inner wall extends between and to an upstream axial end and a downstream axial end. The upstream axial end is disposed at and downstream of the turbine section. The cantilevered inner wall forms a first sealing surface and a second sealing surface axially spaced from the first sealing surface. The inner case extends circumferentially about the rotational axis. The inner case is disposed radially inward of the upstream axial end. The damping seal baffle extends circumferentially about the rotational axis. The damping seal baffle is mounted to the inner case. The damping seal baffle is disposed in contact with one or both of the first sealing surface or the second sealing surface and configured to move relative to the first sealing surface and the second sealing surface.

In any of the aspects or embodiments described above and herein, the damping seal baffle may extend between and to a first baffle end and a second baffle end, the first baffle end may be disposed at the inner case, and the second baffle end may be disposed axially between the upstream axial end and the turbine section.

In any of the aspects or embodiments described above and herein, the damping seal baffle may be formed by a compliant sheet metal body extending between and to the first baffle end and the second baffle end.

In any of the aspects or embodiments described above and herein, the compliant sheet metal body may sequentially include a radial segment, a first convex curved segment, a first concave curved segment, a second convex curved segment, and a second concave curved segment from the first baffle end to the second baffle end.

In any of the aspects or embodiments described above and herein, the first concave segment may be configured to contact the first sealing surface and the second concave segment may be configured to contact the second sealing surface.

In any of the aspects or embodiments described above and herein, the cantilevered inner wall may include a wall portion forming the upstream axial end, the wall portion may include an inner radial side, and the inner radial side may form the first sealing surface facing the rotational axis.

In any of the aspects or embodiments described above and herein, the wall portion may include a chamfer at the inner radial side and the upstream axial end, and the chamfer may form the second sealing surface.

In any of the aspects or embodiments described above and herein, the inner case may extend between and to a first axial case end and a second axial case end, the inner case may be mounted to the turbine case at the first axial case end, and the damping seal baffle may be mounted to the inner case at the second axial case end.

In any of the aspects or embodiments described above and herein, the gas turbine engine may further include a rotational assembly and a bearing assembly, the rotational assembly may include a bladed turbine rotor of the turbine section and a shaft interconnected with the bladed turbine rotor, the bearing assembly may rotationally support the shaft, and the inner case may form a bearing compartment housing of the bearing assembly.

In any of the aspects or embodiments described above and herein, the gas turbine engine may further include an engine exhaust downstream of the turbine section, the engine exhaust may include an exhaust duct, and the cantilevered inner wall may form a portion of the exhaust duct.

In any of the aspects or embodiments described above and herein, the gas turbine engine may further include an axial baffle stopper mounted to the inner case axially between the damping seal baffle and the turbine section, and the axial baffle stopper may be configured to limit axial deflection of the damping seal baffle toward the turbine section.

According to another aspect of the present disclosure, a gas turbine engine for an aircraft includes a turbine section, a turbine case, an inner case, and a damping seal baffle. The turbine section extends along a rotational axis of the gas turbine engine. The turbine section includes a bladed turbine rotor interconnected with a shaft. The turbine case includes an inner wall disposed downstream of the bladed turbine rotor. The inner wall extends circumferentially about the rotational axis. The inner wall extends between and to an upstream axial end and a downstream axial end. The upstream axial end is disposed at and downstream of the bladed turbine rotor. The inner wall forms a first sealing surface and a second sealing surface axially spaced from the first sealing surface. The inner case extends circumferentially about the rotational axis. The inner case is disposed radially inward of the upstream axial end. The inner case extends between and to a first axial case end and a second axial case end. The inner case is mounted to the turbine case at the first axial case end. The inner case forms a bearing compartment housing at the shaft. The damping seal baffle extends circumferentially about the rotational axis, the damping seal baffle mounted to the inner case at the second axial case end, the damping seal baffle disposed in contact with one or both of the first sealing surface or the second sealing surface and configured to move relative to the first sealing surface and the second sealing surface.

In any of the aspects or embodiments described above and herein, the shaft may be operably coupled with a propulsor.

In any of the aspects or embodiments described above and herein, the shaft may be operably coupled with the propulsor by a gear box, and the gear box may be connected to the inner case.

In any of the aspects or embodiments described above and herein, the damping seal baffle may extend between and to a first baffle end and a second baffle end, the first baffle end may be disposed at the inner case, and the second baffle end may be disposed axially between the upstream axial end and the turbine section.

In any of the aspects or embodiments described above and herein, the inner wall may include a wall portion forming the upstream axial end, the wall portion may include an inner radial side and a chamfer, the inner radial side may form the first sealing surface facing the rotational axis, the chamfer may be disposed at the inner radial side and the upstream axial end, and the chamfer may form the second sealing surface.

According to another aspect of the present disclosure, a gas turbine engine for an aircraft includes a turbine section, a turbine case, an inner case, and a damping seal baffle. The turbine section extends along a rotational axis of the gas turbine engine. The turbine case forms an engine exhaust of the gas turbine engine downstream of the turbine section. The engine exhaust includes an exhaust duct. The turbine case includes an outer wall and an inner wall cantilevered from the outer wall. The inner wall forms an inner radial portion of the exhaust duct through the engine exhaust. The inner wall extends circumferentially about the rotational axis. The inner wall extends between and to an upstream axial end and a downstream axial end. The upstream axial end is disposed at and downstream of the turbine section. The downstream axial end is disposed at the outer wall. The inner wall forms a first sealing surface and a second sealing surface axially spaced from the first sealing surface. The inner case extends circumferentially about the rotational axis. The inner case is disposed radially inward of the inner wall. The damping seal baffle includes a compliant sheet metal body extending circumferentially about the rotational axis. The compliant sheet metal body is mounted to the inner case. The compliant sheet metal body is disposed in contact with one or both of the first sealing surface or the second sealing surface and configured to move relative to the first sealing surface and the second sealing surface.

In any of the aspects or embodiments described above and herein, the compliant sheet metal body may extend between and to a first baffle end and a second baffle end, and the compliant sheet metal body may sequentially include a radial segment, a first convex curved segment, a first concave curved segment, a second convex curved segment, and a second concave curved segment from the first baffle end to the second baffle end.

In any of the aspects or embodiments described above and herein, the gas turbine engine may further include an axial baffle stopper mounted to the inner case axially between the damping seal baffle and the turbine section, and the axial baffle stopper may be configured to limit axial deflection of the damping seal baffle toward the turbine section.

In any of the aspects or embodiments described above and herein, the inner wall may include a wall portion forming the upstream axial end, the wall portion may include an inner radial side and a chamfer, the inner radial side may form the first sealing surface facing the rotational axis, the chamfer may be disposed at the inner radial side and the upstream axial end, and the chamfer may form the second sealing surface.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
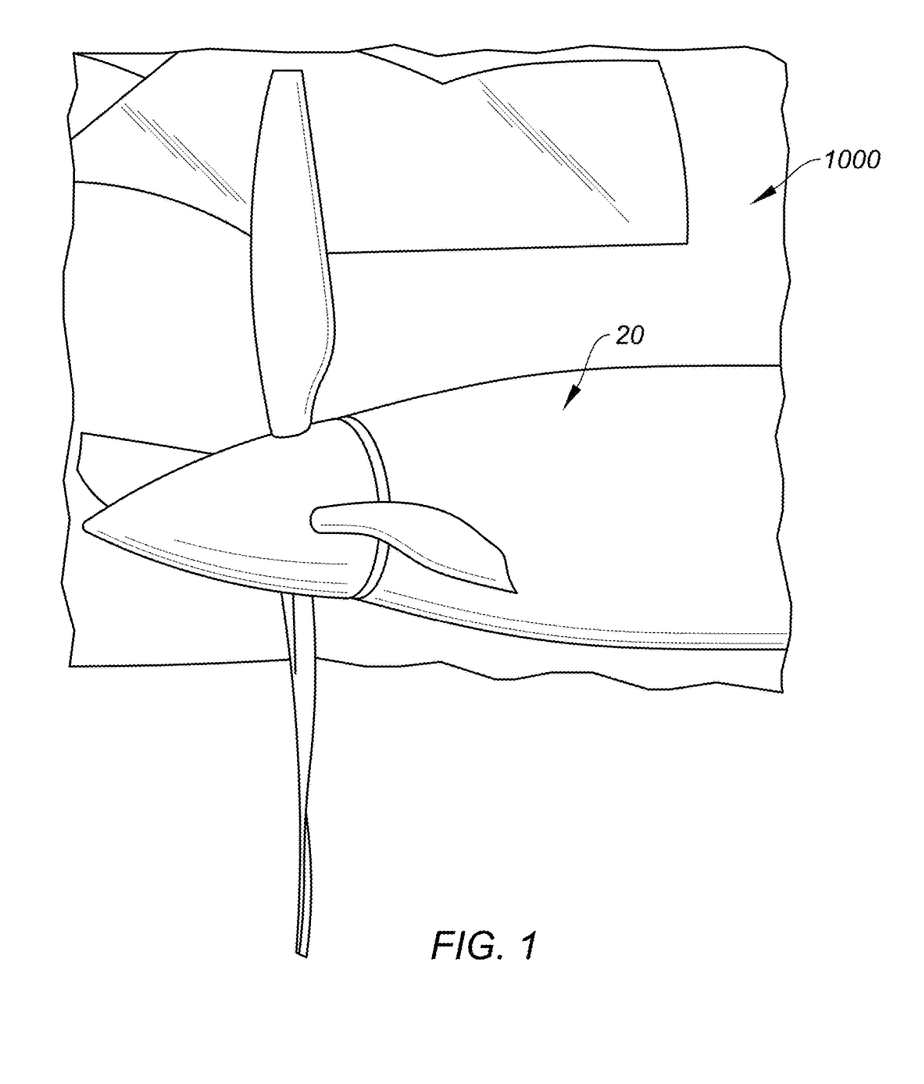
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
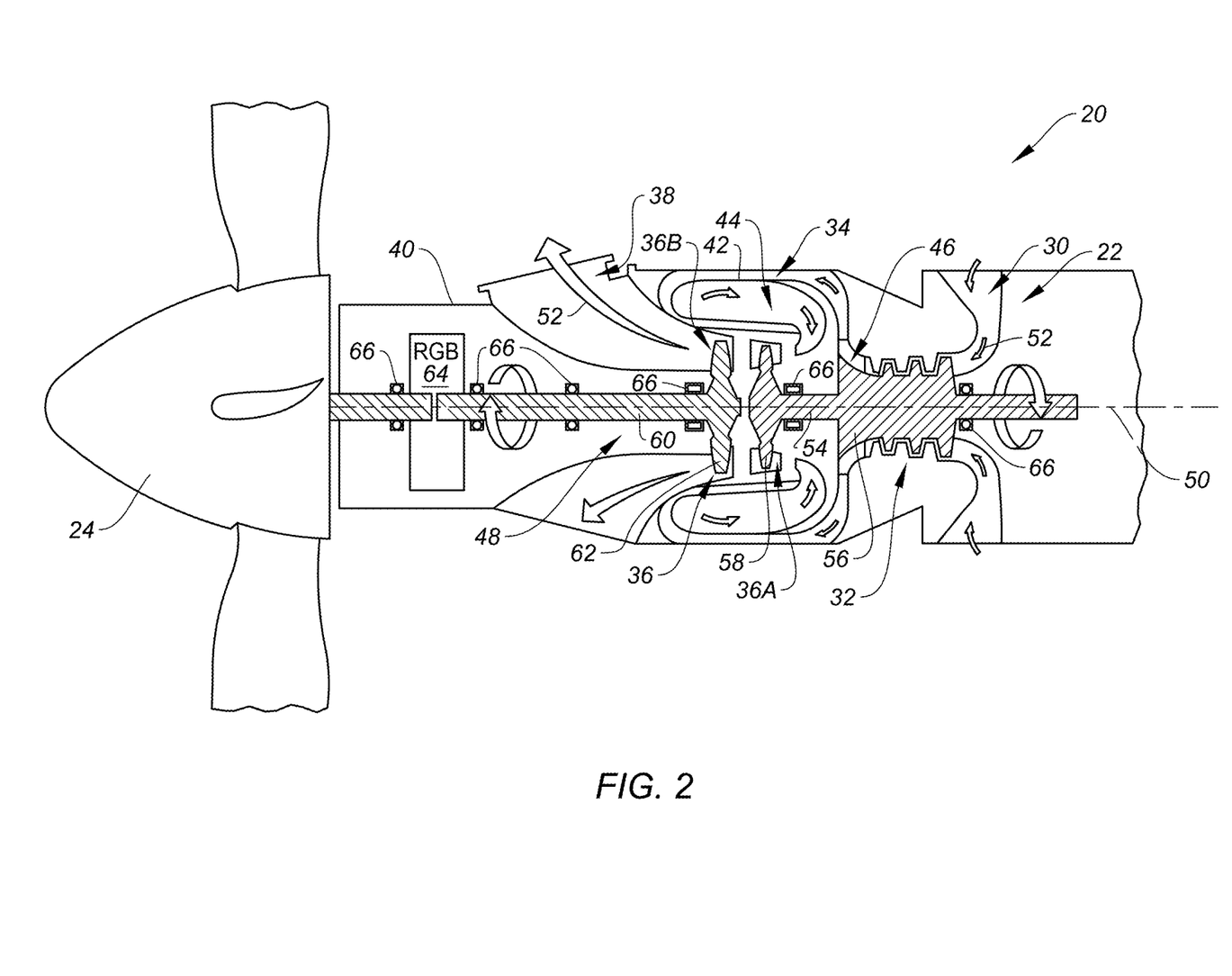
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22 and a propulsor 24. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines which are not part of a propulsion system, for example, an engine for an auxiliary power unit (APU).

The engine 22 of FIG. 2 includes an air intake 30, a compressor section 32, a combustor section 34, a turbine section 36, an engine exhaust 38, and an engine static structure 40. The combustor section 34 includes a combustor 42 (e.g., an annular combustor) forming a combustion chamber 44. The turbine section 36 includes a high-pressure turbine 36A and a power turbine 36B.

Components of the compressor section 32 and/or the turbine section 36 of FIG. 2 form a first rotational assembly 46 (e.g., a high-pressure spool) and a second rotational assembly 48 of the engine 22. The first rotational assembly 46 and the second rotational assembly 48 are mounted for rotation about a rotational axis 50 (e.g., an axial centerline) of the engine 22 relative to the engine static structure 40. The engine 22 of FIG. 2 has a free turbine configuration in which the second rotational assembly 48 is disposed (e.g., entirely disposed) downstream of the first rotational assembly 46 relative to a core gas flow path 52 through the engine 22. For example, the first rotational assembly 46 and the second rotational assembly 48 may be axially separated from one another along the rotational axis 50. The present disclosure, however, is not limited to the foregoing exemplary free turbine configuration of the engine 22.

The first rotational assembly 46 includes a first shaft 54, a bladed compressor rotor 56 for the compressor section 32, and a bladed first turbine rotor 58 for the high-pressure turbine 36A. The first shaft 54 interconnects the bladed compressor rotor 56 and the bladed first turbine rotor 58.

The second rotational assembly 48 of FIG. 2 includes a second shaft 60 and a bladed second turbine rotor 62 for the power turbine 36B. The second shaft 60 is connected to the bladed second turbine rotor 62. The second shaft 60 operably connects (e.g., directly or indirectly connects) the bladed second turbine rotor 62 with the propulsor 24. For example, the second shaft 60 of FIG. 2 is coupled with the propulsor 24 (e.g., a propulsor input shaft) by a gear box 64 (e.g., a reduction gear box (RGB)). The gear box 64 includes a gear assembly (e.g., an epicyclic gear assembly) coupling the second shaft 60 and the propulsor 24. The gear assembly may be a reduction gear assembly configured to drive rotation of the propulsor 24 at a reduced rotational speed relative to the second shaft 60. Of course, the second shaft 60 may alternatively be directly connected to the propulsor 24 to drive the propulsor 24 at the same rotational speed as the second shaft 60.

The engine static structure 40 includes engine casings, cowlings, and other fixed (e.g., non-rotating) structures of the engine 22 which form, house, and/or support components of the engine 22 such as, but not limited to, those of the air intake 30, the compressor section 32, the combustor section 34, the turbine section 36, and the engine exhaust 38. The engine static structure 40 may include one or more bearing assemblies 66 configured to rotationally support components of the first rotational assembly 46 and the second rotational assembly 48.

During operation of the propulsion system 20 of FIG. 2, ambient air enters the propulsion system 20 through the air intake 30 and is directed through the engine 22 along the core gas flow path 52. The ambient air flow along the core gas flow path 52 is compressed in the compressor section 32 by rotation of the bladed compressor rotor 56, and directed into the combustor 42 (e.g., the combustion chamber 44). Fuel is injected into the combustion chamber 44 and mixed with the compressed air to provide a fuel-air mixture. This fuel-air mixture is ignited, and combustion products thereof flow through the high-pressure turbine 36A and the power turbine 36B and are exhausted from the propulsion system 20 through the engine exhaust 38. The bladed first turbine rotor 58 and the bladed second turbine rotor 62 rotationally drive the first rotational assembly 46 and the second rotational assembly 48, respectively, in response to the combustion gas flow through the high-pressure turbine 36A and the power turbine 36B along the core gas flow path 52. The second rotational assembly 48 (e.g., the second shaft 60) drives rotation of the propulsor 24, for example, through the gear box 64.

Figure 3:
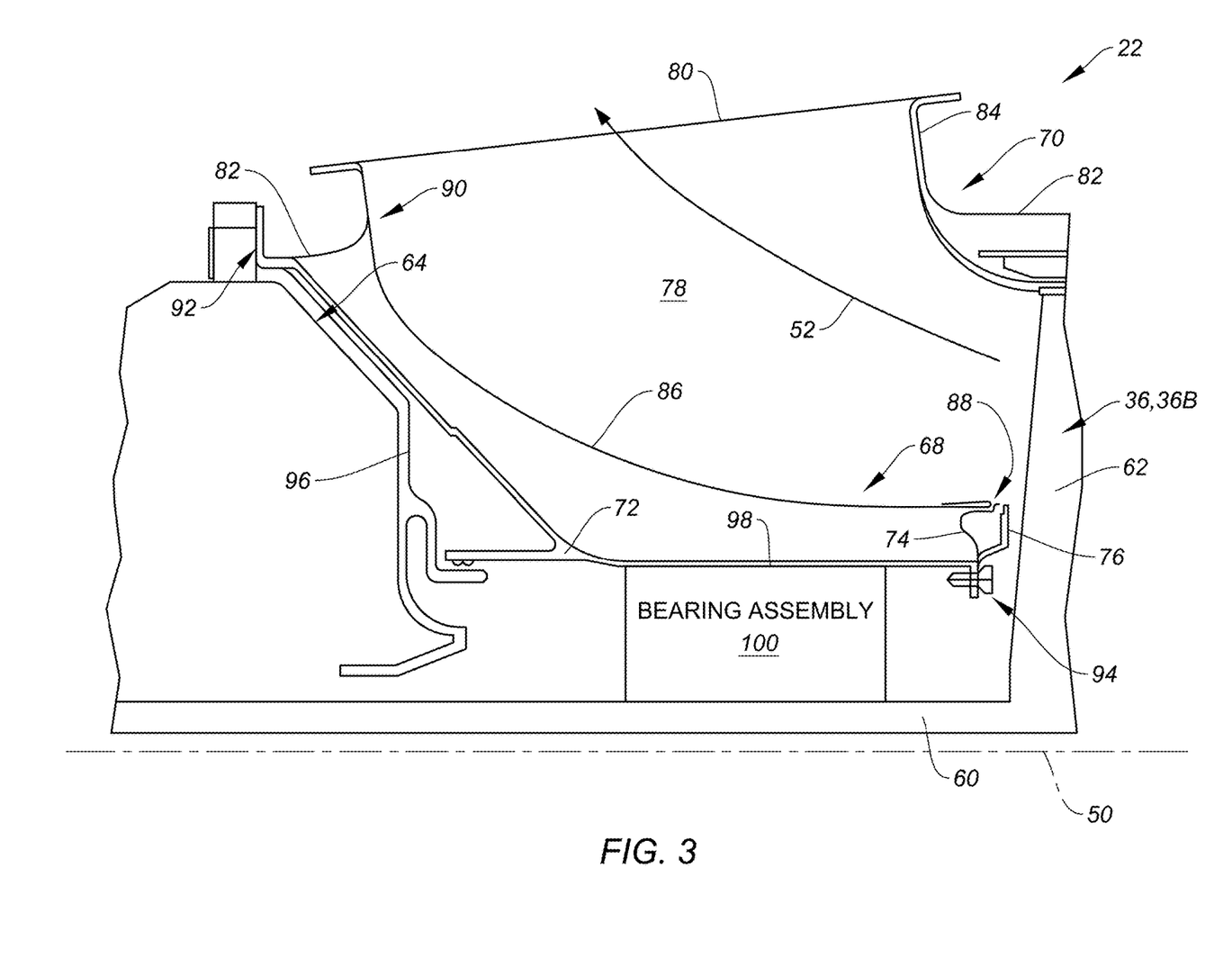
FIG. 3 illustrates a cutaway, side view of a turbine case structure of an engine of the aircraft propulsion system, in accordance with one or more embodiments of the present disclosure.

FIG. 3 illustrates a cutaway, side view of a portion of the engine 22 downstream of the turbine section 36. In particular, FIG. 3 illustrates a turbine case structure 68 forming a portion of the engine static structure 40 at (e.g., on, adjacent, or proximate) the power turbine 36B, the engine exhaust 38, and the gear box 64. The turbine case structure 68 of FIG. 3 includes a turbine case 70, an inner case 72, and a damping seal baffle 74. The turbine case structure 68 may additionally include an axial baffle stopper 76.

The turbine case 70 of FIG. 3 forms an exhaust duct 78 of the engine exhaust 38. The exhaust duct 78 extends from the turbine section 36 (e.g., the power turbine 36B) to an exhaust outlet 80 of the engine exhaust 38. The turbine case 70 includes a turbine case outer wall 82, an exhaust outlet section 84, and a turbine case inner wall 86. The outer wall 82 may form an exterior of the turbine case 70. The outer wall 82 may extend circumferentially about (e.g., completely around) the rotational axis 50 and circumscribe the turbine section 36. The exhaust outlet section 84 forms and circumscribes the exhaust duct 78 at (e.g., on, adjacent, or proximate) the exhaust outlet 80 and the outer wall 82. The inner wall 86 extends along the exhaust duct 78 between and to an upstream axial end 88 of the inner wall 86 and a downstream axial end 90 of the inner wall 86. The upstream axial end 88 is disposed at (e.g., on, adjacent, or proximate) and downstream of the turbine section 36 (e.g., the power turbine 36B). The downstream axial end 90 is connected to and/or disposed at (e.g., on, adjacent, or proximate) the outer wall 82 and the exhaust outlet section 84. The inner wall 86 extends circumferentially about (e.g., completely around) the rotational axis 50. The inner wall 86 forms an inner radial boundary for the core gas flow path 52 through the exhaust duct 78. As shown in FIG. 3, the inner wall 86 is cantilevered such that the inner wall 86 is supported (e.g., fixed to the outer wall 82) at the downstream axial end 90 and unsupported at the upstream axial end 88 (with the exception of the damping seal baffle 74). In other words, the inner wall 86 is not mounted to or otherwise fixed relative to another case, housing, or the like of the engine static structure 40, thereby allowing the upstream axial end 88 to move axially and radially, for example, during operation of the engine 22.

The inner case 72 is disposed radially inward of the inner wall 86. The inner case 72 extends between and to a first axial end 92 of the inner case 72 and a second axial end 94 of the inner case 72. The first axial end 92 may be mounted to or otherwise disposed at (e.g., on, adjacent, or proximate) the outer wall 82. The second axial end 94 is disposed at (e.g., on, adjacent, or proximate) and downstream of the turbine section 36 (e.g., the power turbine 36B). The second axial end 94 is disposed at (e.g., on, adjacent, or proximate) an axial position of the upstream axial end 88 and radially inward of the upstream axial end 88. The inner case 72 may additionally be mounted to or otherwise supported by a gear box housing 96 of the gear box 64. The inner case 72 of FIG. 3 forms a bearing compartment housing 98 for a bearing assembly 100 (e.g., one of the bearing assemblies 66). The bearing compartment housing 98 of FIG. 3 structurally supports the bearing assembly 100 which, in turn, supports the second shaft 60.

Figure 4:
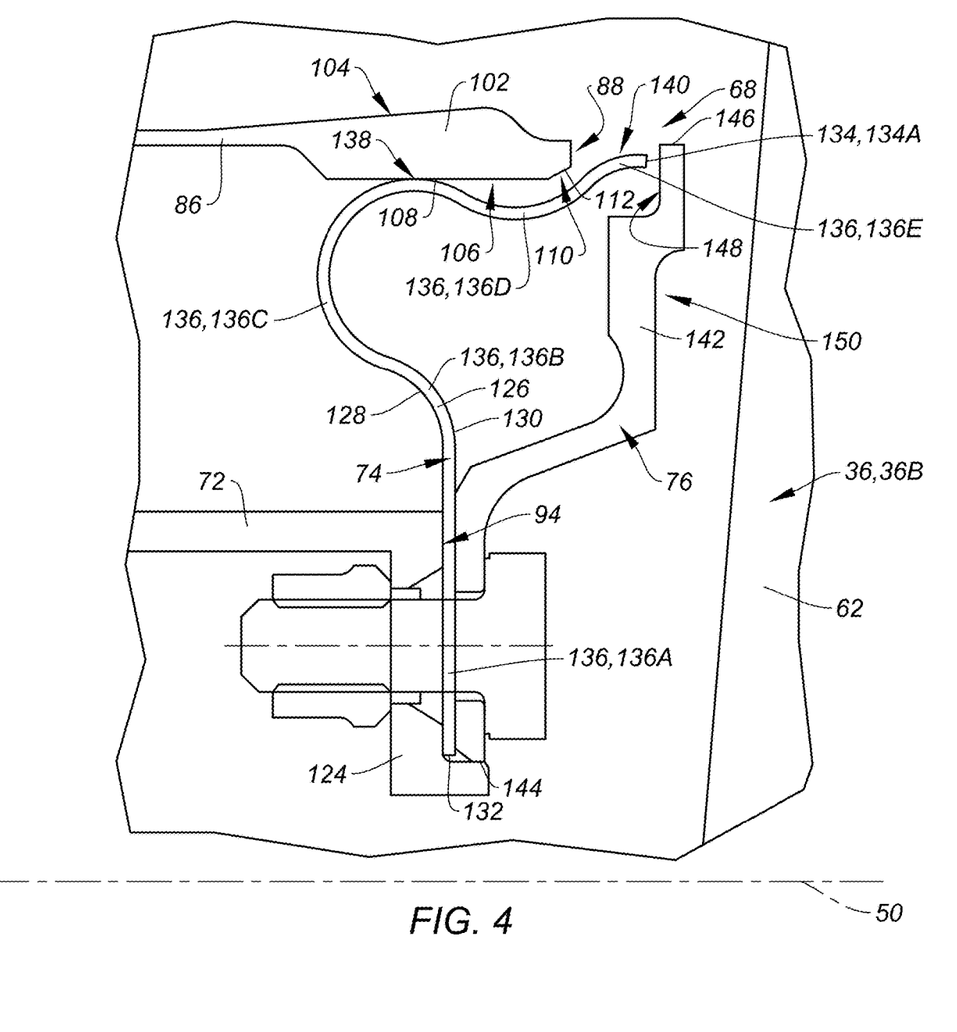
FIG. 4 illustrates a cutaway, side view of a portion of the turbine case structure including a damping seal baffle, in accordance with one or more embodiments of the present disclosure.
Figure 5:
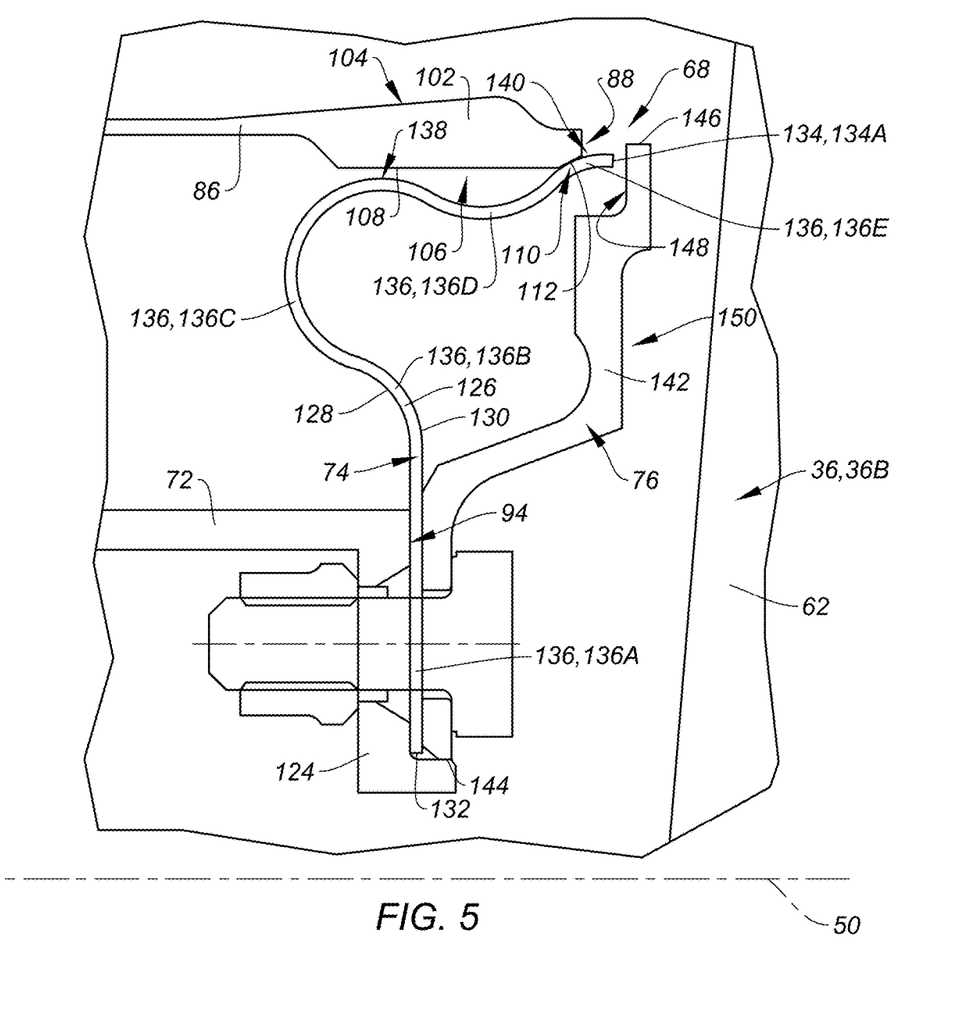
FIG. 5 illustrates another cutaway, side view of a portion of the turbine case structure including a damping seal baffle, in accordance with one or more embodiments of the present disclosure.

FIGS. 4 and 5 illustrate cutaway, side views of a portion of the turbine case structure 68 in greater detail. As will be discussed in further detail, FIG. 4 illustrates the turbine case structure 68 in a cold condition while FIG. 5 illustrates the turbine case structure 68 in a hot condition. As used herein to facilitate description of the turbine case structure 68, the term "cold condition" is used to refer to a general thermal condition of the turbine case structure 68 which is cooler, relatively, than the "hot condition," and should not be considered otherwise limiting.

The inner wall 86 includes a wall portion 102 forming the upstream axial end 88. The wall portion 102 extends circumferentially about (e.g., completely around) the rotational axis 50. The wall portion 102 may form an enlarged portion of the inner wall 86 (e.g., having a greater thickness relative to downstream portions of the inner wall 86), however, the wall portion 102 is not limited to any particular shape relative to other portions of the inner wall 86. The wall portion 102 includes an outer radial side 104 of the wall portion 102 and an inner radial side 106 of the wall portion 102. The outer radial side 104 forms a portion of the exhaust duct 78. The inner radial side 106 faces toward the rotational axis 50. The inner radial side 106 forms a sealing surface 108 extending circumferentially about (e.g., completely around) the rotational axis 50. The wall portion 102 may additionally include a chamfer 110 at (e.g., on, adjacent, or proximate) the inner radial side 106 and the upstream axial end 88. The chamfer 110 may form a sealing surface 112 extending circumferentially about (e.g., completely around) the rotational axis 50.

The inner case 72 of FIGS. 4 and 5 is positioned with the second axial end 94 disposed at (e.g., on, adjacent, or proximate) and downstream of the turbine section 36 (e.g., the power turbine 36B). For example, the second axial end 94 may be disposed axially coincident with the wall portion 102 (e.g., the sealing surface 108) and axially spaced from the upstream axial end 88 (e.g., axially further from the turbine section 36 than the upstream axial end 88). The inner case 72 includes a flange 124 at (e.g., on, adjacent, or proximate) the second axial end 94.

The damping seal baffle 74 is mounted to the inner case 72 at (e.g., on, adjacent, or proximate) the second axial end 94. For example, the damping seal baffle 74 may be mounted to the inner case 72 on the flange 124 (e.g., by a plurality of mechanical fasteners). The damping seal baffle 74 extends circumferentially about (e.g., completely around) the rotational axis 50. The damping seal baffle 74 is configured to be disposed in contact with one or both of the sealing surface 108 and the sealing surface 112 as shown, for example, in FIGS. 4 and 5.

FIGS. 4 and 5 illustrate a cross-sectional shape of the damping seal baffle 74 taken, for example, along a plane lying on the rotational axis 50. The damping seal baffle 74 of FIGS. 4 and 5 includes a sheet body 126 (e.g., a compliant sheet metal body). The sheet body 126 extends between and to a first sheet side 128 of the sheet body 126 and a second sheet side 130 of the sheet body 126 through a thickness of the sheet body 126. The first sheet side 128 and the second sheet side 130 extend (e.g., along a length of the sheet body 126) between and to first end 132 of the sheet body 126 and a second end 134 of the sheet body 126. The first end 132 may be disposed at (e.g., on, adjacent, or proximate) the second axial end 94. The second end 134 may be disposed at a distal axial end 134A of the damping seal baffle 74 proximate the turbine section 36 and/or the axial baffle stopper 76. The second end 134 may generally be disposed radially coincident with the wall portion 102 and axially between the upstream axial end 88 and the turbine section 36.

The cross-sectional shape of the sheet body 126 of FIGS. 4 and 5 is characterized by a plurality of body segments 136 sequentially arranged and extending between and to the first end 132 and the second end 134. As an example, the body segments 136 of the sheet body 126 of FIGS. 4 and 5 include a radial segment 136A, a convex curved segment 136B, a concave curved segment 136C, a convex curved segment 136D, and a concave curved segment 136E. Of course, the present disclosure damping seal baffle 74 is not limited to inclusion of each of the aforementioned body segments 136, and the cross-sectional shape of the sheet body 126 may vary while still contacting the inner wall 86 (e.g., the sealing surface 108 and/or the sealing surface 112) and facilitating the damping and sealing functions described herein for the damping seal baffle 74. As used herein, the terms "convex" and "concave" refer to a curvature orientation of the sheet body 126 relative to the second sheet side 130 and generally facing the turbine section 36 and/or the axial baffle stopper 76. The radial segment 136A extends (e.g., generally radially) between and to the first end 132 and the convex curved segment 136B. The radial segment 136A is mounted to the inner case 72 at (e.g., on, adjacent, or proximate) the second axial end 94, for example, on the flange 124. The convex curved segment 136B extends between and to the radial segment 136A and the concave curved segment 136C. The convex curved segment 136B generally curves radially outward and generally curves axially away from the turbine section 36 from the radial segment 136A to the concave curved segment 136C. The concave curved segment 136C extends between and to the convex curved segment 136B and the convex curved segment 136D. The concave curved segment 136C generally curves axially away from the turbine section 36, radially outward, and then axially toward the turbine section 36 from the convex curved segment 136B to the convex curved segment 136D. The concave curved segment 136C forms an outer radial end 138 of the concave curved segment 136C on the first sheet side 128. The convex curved segment 136D extends between and to the concave curved segment 136C and the concave curved segment 136E. The convex curved segment 136D generally curves axially toward the turbine section 36 and generally curves radially inward and then radially outward from the concave curved segment 136C to the concave curved segment 136D. The concave curved segment 136E extends between and to the convex curved segment 136D and the second end 134. The concave curved segment 136D generally curves axially toward the turbine section 36 and radially outward. The concave curved segment 136E forms an outer radial end 140 of the concave curved segment 136E on the first sheet side 128.

The turbine case structure 68 may additionally include the axial baffle stopper 76 to limit deflection of the damping seal baffle 74 during operation of the engine 22. The axial baffle stopper 76 includes a stopper body 142 (e.g., a rigid body). The stopper body 142 extends circumferentially about (e.g., completely around) the rotational axis 50. The stopper body 142 extends between and to an inner radial end 144 of the stopper body 142 and an outer radial end 146 of the stopper body 142. The stopper body 142 may be mounted to the inner case 72 at the inner radial end 144. The stopper body 142 may be mounted to the inner case 72 at (e.g., on, adjacent, or proximate) the second axial end 94, for example, on the flange 124. The outer radial end 146 may be disposed at (e.g., on, adjacent, or proximate) the concave curved segment 136E and/or the second end 134. The stopper body 142 may be disposed axially between the damping seal baffle 74 and the turbine section 36. The stopper body 142 extends between and to a first axial side 148 of the stopper body 142 and a second axial side 150 of the stopper body 142. The first axial side 148 and the second axial side 150 extend between and to the inner radial end 144 and the outer radial end 146. The first axial side 148 faces toward the damping seal baffle 74 while the second axial side 150 faces away from the damping seal baffle 74 (e.g., toward the turbine section 36). The first axial side 148 at (e.g., on, adjacent, or proximate) the inner radial end 144 may be axially spaced from the first axial side 148 at (e.g., on, adjacent, or proximate) the outer radial end 146. For example, the first axial side 148 at (e.g., on, adjacent, or proximate) the outer radial end 146 may be axially closer to the turbine section 36 than the first axial side 148 at (e.g., on, adjacent, or proximate) the inner radial end 144.

Figure 6:
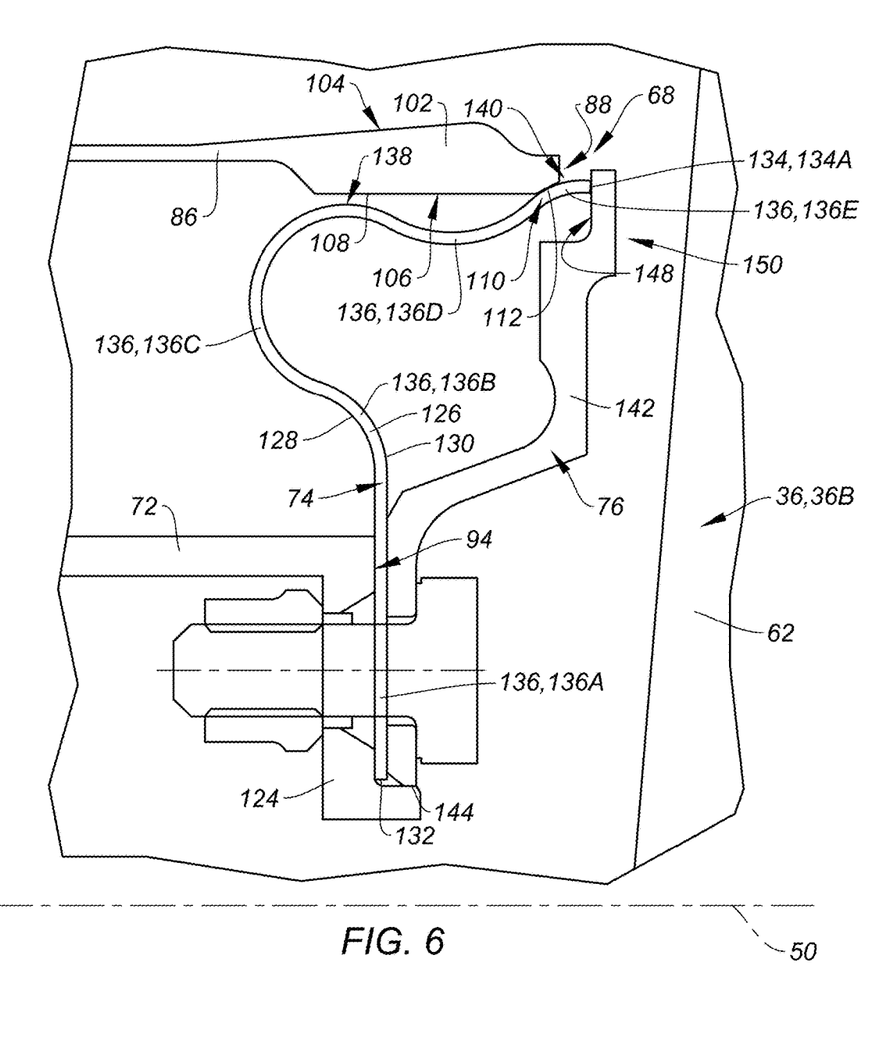
FIG. 6 illustrates another cutaway, side view of a portion of the turbine case structure including a damping seal baffle, in accordance with one or more embodiments of the present disclosure.

During operation of the engine 22, the cantilevered configuration of the inner wall 86 may cause the inner wall 86 to experience substantial dynamic excitation (e.g., vibration). In the absence of the damping seal baffle 74, the high-amplitude deflections of the inner wall 86 may induce substantial stress in portions of the turbine case 70 (e.g., the inner wall 86), thereby increasing the likelihood of crack formation in the turbine case 70. The damping seal baffle 74 is positioned to contact the inner wall 86 (e.g., the wall portion 102) at one or more positions such as, but not limited to, the sealing surface 108 and/or the sealing surface 112. The damping seal baffle 74 is configured to maintain damping contact with the inner wall 86 (e.g., the seal platform surface 122) over a range of thermal conditions, for example, the cold condition and the hot condition shown in FIGS. 4 and 5, respectively. For example, as shown in FIG. 4, damping seal baffle 74 may initially contact the sealing surface 108 at (e.g., on, adjacent, or proximate) the outer radial end 138. As can be understood from FIGS. 4 and 5, as a temperature at the turbine case structure 68 increases, the wall portion 102 may shift radially outward from and axially toward the turbine section 36, relative to the inner case 72. This shifting of the wall portion 102 may cause the damping seal baffle 74 (e.g., the outer radial end 138) to separate from the sealing surface 108 but may also cause the damping seal baffle 74 to contact the sealing surface 112 at (e.g., on, adjacent, or proximate) the outer radial end 140, as shown in FIG. 5, thereby causing the damping seal baffle 74 to maintain contact with the wall portion 102. The damping seal baffle 74 positioned in contact with the wall portion 102 facilitates damping of the inner wall 86, limiting deflection of the inner wall 86 and, thereby reducing vibration-induced stresses on the turbine case 70. As shown in FIG. 6, under some thermal conditions, the wall portion 102 (e.g., the sealing surface 112) may deflect (e.g., push) the damping seal baffle 74 such that the second end 134 contacts the axial baffle stopper 76 (e.g., the first axial side 148), for example, at (e.g., on, adjacent, or proximate) the outer radial end 146. The axial baffle stopper 76 may limit further deflection of the damping seal baffle 74 in the axial direction and, thereby, prevent or reduce the likelihood of permanent deformation of the damping seal baffle 74. The axial baffle stopper 76 may additionally prevent the damping seal baffle 74 (e.g., the second end 134) from contacting a rotating component of the turbine section 36 such as the bladed second turbine rotor 62. The damping seal baffle 74 additionally facilitates fluid sealing between the inner case 72 and the turbine case 70 (e.g., the inner wall 86).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A gas turbine engine for an aircraft, the gas turbine engine comprising:
   a turbine section extending along a rotational axis of the gas turbine engine;
   a turbine case including a cantilevered inner wall disposed downstream of the turbine section, the cantilevered inner wall extending circumferentially about the rotational axis, the cantilevered inner wall extending between and to an upstream axial end and a downstream axial end, the upstream axial end disposed at and downstream of the turbine section, the cantilevered inner wall forming a first sealing surface and a second sealing surface axially spaced from the first sealing surface;
   an inner case extending circumferentially about the rotational axis, the inner case disposed radially inward of the upstream axial end; and
   a damping seal baffle extending circumferentially about the rotational axis, the damping seal baffle mounted to the inner case, the damping seal baffle disposed in contact with one or both of the first sealing surface or the second sealing surface and configured to move relative to the first sealing surface and the second sealing surface.

2. The gas turbine engine of claim 1, wherein the damping seal baffle extends between and to a first baffle end and a second baffle end, the first baffle end is disposed at the inner case, and the second baffle end is disposed axially between the upstream axial end and the turbine section.

3. The gas turbine engine of claim 2, wherein the damping seal baffle is formed by a compliant sheet metal body extending between and to the first baffle end and the second baffle end.

4. The gas turbine engine of claim 3, wherein the compliant sheet metal body sequentially includes a radial segment, a first convex curved segment, a first concave curved segment, a second convex curved segment, and a second concave curved segment from the first baffle end to the second baffle end.

5. The gas turbine engine of claim 4, wherein the first concave segment is configured to contact the first sealing surface and the second concave segment is configured to contact the second sealing surface.

6. The gas turbine engine of claim 1, wherein the cantilevered inner wall includes a wall portion forming the upstream axial end, the wall portion includes an inner radial side, and the inner radial side forms the first sealing surface facing the rotational axis.

7. The gas turbine engine of claim 6, wherein the wall portion includes a chamfer at the inner radial side and the upstream axial end, and the chamfer forms the second sealing surface.

8. The gas turbine engine of claim 1, wherein the inner case extends between and to a first axial case end and a second axial case end, the inner case is mounted to the turbine case at the first axial case end, and the damping seal baffle is mounted to the inner case at the second axial case end.

9. The gas turbine engine of claim 1, further comprising a rotational assembly and a bearing assembly, the rotational assembly includes a bladed turbine rotor of the turbine section and a shaft interconnected with the bladed turbine rotor, the bearing assembly rotationally supports the shaft, and the inner case forms a bearing compartment housing of the bearing assembly.

10. The gas turbine engine of claim 1, further comprising an engine exhaust downstream of the turbine section, the engine exhaust including an exhaust duct, the cantilevered inner wall forming a portion of the exhaust duct.

11. The gas turbine engine of claim 1, further comprising an axial baffle stopper mounted to the inner case axially between the damping seal baffle and the turbine section, the axial baffle stopper configured to limit axial deflection of the damping seal baffle toward the turbine section.

12. A gas turbine engine for an aircraft, the gas turbine engine comprising:
   a turbine section extending along a rotational axis of the gas turbine engine, the turbine section including a bladed turbine rotor interconnected with a shaft;
   a turbine case including an inner wall disposed downstream of the bladed turbine rotor, the inner wall extending circumferentially about the rotational axis, the inner wall extending between and to an upstream axial end and a downstream axial end, the upstream axial end disposed at and downstream of the bladed turbine rotor, the inner wall forming a first sealing surface and a second sealing surface axially spaced from the first sealing surface;
   an inner case extending circumferentially about the rotational axis, the inner case disposed radially inward of the upstream axial end, the inner case extending between and to a first axial case end and a second axial case end, the inner case mounted to the turbine case at the first axial case end, the inner case forming a bearing compartment housing at the shaft; and
   a damping seal baffle extending circumferentially about the rotational axis, the damping seal baffle mounted to the inner case at the second axial case end, the damping seal baffle disposed in contact with one or both of the first sealing surface or the second sealing surface and configured to move relative to the first sealing surface and the second sealing surface.

13. The gas turbine engine of claim 12, wherein the shaft is operably coupled with a propulsor.

14. The gas turbine engine of claim 13, wherein the shaft is operably coupled with the propulsor by a gear box, and the gear box is connected to the inner case.

15. The gas turbine engine of claim 12, wherein the damping seal baffle extends between and to a first baffle end and a second baffle end, the first baffle end is disposed at the inner case, and the second baffle end is disposed axially between the upstream axial end and the turbine section.

16. The gas turbine engine of claim 12, wherein the inner wall includes a wall portion forming the upstream axial end, the wall portion includes an inner radial side and a chamfer, the inner radial side forms the first sealing surface facing the rotational axis, the chamfer is disposed at the inner radial side and the upstream axial end, and the chamfer forms the second sealing surface.

17. A gas turbine engine for an aircraft, the gas turbine engine comprising:

a turbine section extending along a rotational axis of the gas turbine engine;

a turbine case forming an engine exhaust of the gas turbine engine downstream of the turbine section, the engine exhaust including an exhaust duct, the turbine case including an outer wall and an inner wall cantilevered from the outer wall, the inner wall forming an inner radial portion of the exhaust duct through the engine exhaust, the inner wall extending circumferentially about the rotational axis, the inner wall extending between and to an upstream axial end and a downstream axial end, the upstream axial end disposed at and downstream of the turbine section, the downstream axial end disposed at the outer wall, the inner wall forming a first sealing surface and a second sealing surface axially spaced from the first sealing surface;

an inner case extending circumferentially about the rotational axis, the inner case disposed radially inward of the inner wall; and a damping seal baffle including a compliant sheet metal body extending circumferentially about the rotational axis, the compliant sheet metal body mounted to the inner case, the compliant sheet metal body disposed in contact with one or both of the first sealing surface or the second sealing surface and configured to move relative to the first sealing surface and the second sealing surface.

18. The gas turbine engine of claim 17, wherein the compliant sheet metal body extends between and to a first baffle end and a second baffle end, and the compliant sheet metal body sequentially includes a radial segment, a first convex curved segment, a first concave curved segment, a second convex curved segment, and a second concave curved segment from the first baffle end to the second baffle end.

19. The gas turbine engine of claim 17, further comprising an axial baffle stopper mounted to the inner case axially between the damping seal baffle and the turbine section, the axial baffle stopper configured to limit axial deflection of the damping seal baffle toward the turbine section.

20. The gas turbine engine of claim 17, wherein the inner wall includes a wall portion forming the upstream axial end, the wall portion includes an inner radial side and a chamfer, the inner radial side forms the first sealing surface facing the rotational axis, the chamfer is disposed at the inner radial side and the upstream axial end, and the chamfer forms the second sealing surface.

* * * * *